US008824558B2

(12) United States Patent
Lin et al.

(10) Patent No.: US 8,824,558 B2
(45) Date of Patent: Sep. 2, 2014

(54) METHOD AND APPARATUS OF SPATIAL MOTION VECTOR PREDICTION

(75) Inventors: Jian-Liang Lin, Yilan (TW); Yu-Pao Tsai, Kaohsiung (TW); Yu-Wen Huang, Taipei (TW); Shaw-min Lei, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 413 days.

(21) Appl. No.: 13/047,600

(22) Filed: Mar. 14, 2011

(65) Prior Publication Data

US 2012/0128060 A1 May 24, 2012

Related U.S. Application Data

(60) Provisional application No. 61/416,413, filed on Nov. 23, 2010, provisional application No. 61/431,454, filed on Jan. 11, 2011.

(51) Int. Cl.
*H04N 11/02* (2006.01)
*H04N 7/36* (2006.01)
*H04N 7/26* (2006.01)
*H04N 7/34* (2006.01)

(52) U.S. Cl.
CPC ..... *H04N 19/00696* (2013.01); *H04N 7/26026* (2013.01); *H04N 7/34* (2013.01)
USPC ...................................................... 375/240.2

(58) Field of Classification Search
USPC ........... 375/240; 382/236, 238, 239; 348/699; 386/355
See application file for complete search history.

(56) References Cited

U.S. PATENT DOCUMENTS

| 7,667,778 | B2* | 2/2010 | Yoshiwara ..................... 348/699 |
| 8,155,191 | B2* | 4/2012 | Lu et al. ..................... 375/240.15 |
| 8,379,722 | B2* | 2/2013 | Tourapis et al. ......... 375/240.16 |
| 2009/0060044 | A1* | 3/2009 | Suh et al. ................. 375/240.16 |
| 2010/0316362 | A1* | 12/2010 | Jeon et al. ...................... 386/355 |
| 2012/0177109 | A1* | 7/2012 | Ye et al. ..................... 375/240.03 |
| 2012/0236941 | A1* | 9/2012 | Lin et al. .................. 375/240.16 |
| 2012/0236942 | A1* | 9/2012 | Lin et al. .................. 375/240.16 |

OTHER PUBLICATIONS

Tourapis, et al., "Direct Mode Coding for Bipredictive Slices in the H.264 Standard", in IEEE Trans. on Circuits and Systems for Video Technology, vol. 15, No. 1, pp. 119-126, Jan. 2005.
Laroche, et al.,"RD Optimized Coding for Motion Vector Predictor Selection", in IEEE Trans. on Circuits and Systems for Video Technology, vol. 18, No. 12, pp. 1681-1691, Dec. 2008.

* cited by examiner

*Primary Examiner* — Sath V Perungavoor
*Assistant Examiner* — Matthew J Anderson
(74) *Attorney, Agent, or Firm* — Blairtech Solution LLC

(57) ABSTRACT

An apparatus and method for deriving a motion vector predictor (MVP) or a MVP candidate for a current block are disclosed. Embodiments according of the present invention receive a first motion vector associated a first reference picture in a first reference picture list and a second motion vector associated with a second reference picture in a second reference picture list of a spatially neighboring block. A MVP or at least one MVP candidate associated with a selected reference picture in a selected reference picture list for the current block is then determined based on the first reference picture, the second reference picture and the selected reference picture according to a pre-defined priority order. The MVP or MVP candidate is determined depending on whether the first reference picture is the same as the selected reference picture or whether the second reference picture is the same as the selected reference picture.

18 Claims, 7 Drawing Sheets

METHOD AND APPARATUS OF SPATIAL MOTION VECTOR PREDICTION

CROSS REFERENCE TO RELATED APPLICATIONS

The present invention claims priority to U.S. Provisional Patent Application, No. 61/416,413, filed Nov. 23, 2010, entitled "New Spatial Motion Vector Predictor" and U.S. Provisional Patent Application, No. 61/431,454, filed Jan. 11, 2011, entitled "Improved Advanced Motion Vector Prediction". The U.S. Provisional Patent Applications are hereby incorporated by reference in their entireties.

FIELD OF THE INVENTION

The present invention relates to video coding. In particular, the present invention relates to coding techniques associated with motion vector prediction.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally.

In HEVC development, a technique named Advanced Motion Vector Prediction (AMVP) is currently being considered. The AMVP technique uses explicit predictor signaling to indicate the MVP candidate selected from a MVP candidate set. The MVP candidate set includes spatial MVP candidates as well as temporal candidates, where the spatial MVP candidates include three candidates selected from three respective neighboring groups of the current block. The MVP candidate set proposed for the AMVP also includes the median of the three spatial candidates and a temporal MVP candidate. The AMVP technique only considers the MV (motion vector) with the same reference picture list and the same reference picture index as the current block as an available spatial MVP candidate. If the MV with the same reference picture list and the same reference picture index is not available, the AMVP technique looks for available motion vector from the next neighboring block in the group. It is very desirable to develop a MVP scheme that can improve the availability of the MVP candidate of the neighboring block. The improved MVP scheme may cause smaller motion vector residues and consequently the coding efficiency can be improved. Furthermore, it is desirable that the MVP scheme will allow the predictor to be derived at the decoder based on decoded information so that no additional side information has to be transmitted.

BRIEF SUMMARY OF THE INVENTION

An apparatus and method for deriving motion vector predictor or motion vector predictor candidate or motion vector or motion vector candidate for a current block in a picture based on motion vectors from a spatially neighboring block are disclosed. In one embodiment according to the present invention, the apparatus and method for deriving motion vector predictor or motion vector predictor candidate or motion vector or motion vector candidate for a current block comprises steps of receiving a first motion vector associated a first reference picture in a first reference picture list and a second motion vector associated with a second reference picture in a second reference picture list of a spatially neighboring block; and determining a MVP (motion vector predictor) or at least one MVP candidate or a MV (motion vector) or at least one MV candidate associated with a selected reference picture in a selected reference picture list for a current block based on the first motion vector, the second motion vector, the first reference picture, the second reference picture, and the selected reference picture according to a priority order. The first reference picture list and the second reference picture list may be list 0 and list 1, or vice versa, and the selected reference picture list may be list 0 or list 1. The priority order is pre-defined in one embodiment according to the present invention and the priority order is determined according to an adaptive scheme in another embodiment according to the present invention. When the pre-defined order is used, information associated with the pre-defined priority order can be incorporated in a sequence header, a picture header, or a slice header. The adaptive scheme can be based on a criterion selected from a group consisting of statistic of reconstructed motion vectors of previous blocks, partition type of the current block, correlation of the motion vectors, directions of motion vectors, and distance of the motion vectors. The MVP or the MVP candidate or the MV or the MV candidate is based on a scaled version of the first motion vector and/or the second motion vector, or a combination of the scaled version and non-scaled version of the first motion vector and/or the second motion vector in one embodiment according to the present invention. In another embodiment according to the present invention, the derivation of a MVP or at least one MVP candidate or a MV or a MV candidate is based on a first condition and a second condition, wherein the first condition is related to whether the first motion vector exists and whether the first reference picture is the same as the selected reference picture, and wherein the second condition is related to whether the second motion vector exists and whether the second reference picture is the same as the selected reference picture. Furthermore, a MVP candidate set or a MV candidate set can be derived based on the first motion vector and the second motion.

DETAILED DESCRIPTION OF THE INVENTION

Figure 1:
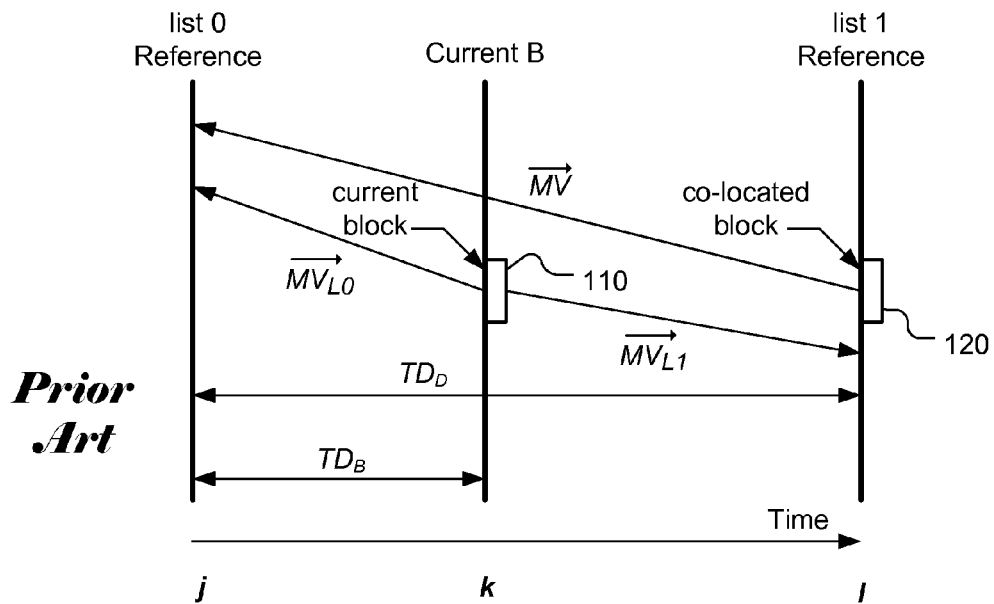
FIG. 1 illustrates motion vector scaling of DIRECT mode prediction in B slice coding according to a prior art.

In video coding systems, the spatial and temporal redundancy is exploited using spatial and temporal prediction to reduce the bitrate to be transmitted or stored. The spatial prediction utilizes decoded pixels from the same picture to form prediction for current pixels to be coded. The spatial prediction is often operated on a block by block basis, such as 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Consequently, Motion Compensated Prediction (MCP) is often used to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction, respectively, where both list 0 and list 1 can contain multiple reference pictures prior to or/and later than the current picture in the display order. The following describes the default reference picture list configuration. For list 0, reference pictures prior to the current picture have lower reference picture indices than those later than the current picture. For list 1, reference pictures later than the current picture have lower reference picture indices than those prior to the current picture. For both list 0 and list 1, after applying the previous rules, the temporal distance is considered as follows: a reference picture closer to the current picture has a lower reference picture index. To illustrate the list 0 and list 1 reference picture configuration, the following example is provided where the current picture is picture 5 and pictures 0, 2, 4, 6, and 8 are reference pictures, where the numbers denote the display order. The list 0 reference pictures with ascending reference picture indices and starting with index equal to zero are 4, 2, 0, 6, and 8. The list 1 reference pictures with ascending reference picture indices and starting with index equal to zero are 6, 8, 4, 2, and 0. The first reference picture having index 0 is called co-located picture, and in this example with picture 5 as the current picture, picture 6 is the list 1 co-located picture, and picture 4 is the list 0 co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction in addition to the list 0 prediction.

In video coding systems, the motion vector and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years. In this disclosure, MVP may also refer to Motion Vector Predictor and the abbreviation is used when there is no ambiguity. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

In the H.264/AVC standard, there is also a SKIP mode in additional to the conventional Intra and Inter modes for macroblocks in a P slice. The SKIP is a very effective method to achieve large compression since there is no quantized error signal, no motion vector, nor reference index parameter to be transmitted. The only information required for the 16×16 macroblock in the SKIP mode is a signal to indicate the SKIP mode being used and therefore substantial bitrate reduction is achieved. The motion vector used for reconstructing the SKIP macroblock is similar to the motion vector predictor for a macroblock. A good MVP scheme may result in more zero motion vector residues and zero quantized prediction errors. Consequently, a good MVP scheme may increase the number of SKIP-coded blocks and improve the coding efficiency.

In the H.264/AVC standard, four different types of inter-prediction are supported for B slices including list 0, list 1, bi-predictive, and DIRECT prediction, where list 0 and list 1 refer to prediction using reference picture group 0 and group 1 respectively. For the bi-predictive mode, the prediction signal is formed by a weighted average of motion-compensated list 0 and list 1 prediction signals. The DIRECT prediction mode is inferred from previously transmitted syntax elements and can be either list 0 or list 1 prediction or bi-predictive. Therefore, there is no need to transmit information for motion vector in the DIRECT mode. In the case that no quantized error signal is transmitted, the DIRECT macroblock mode is referred to as B SKIP mode and the block can be efficiently coded. Again, a good MVP scheme may result in more zero motion vector residues and smaller prediction errors. Consequently, a good MVP scheme may increase the number of DIRECT-coded blocks and improve the coding efficiency.

In HEVC being developed, some improvements of motion vector prediction over the H.264/AVC are being considered. In this disclosure, a system and method for deriving motion vector predictor candidate for a current block based on motion vectors from a spatially neighboring block are disclosed. The motion vector for a current block is predicted by the motion vectors of the spatially neighboring blocks associated with list 0 reference pictures and list 1 reference pictures. The motion vectors are considered as candidates of predictor for the current block and the candidates are arranged in priority order. The candidate with higher priority order will be considered as predictor ahead of a candidate with a lower priority order. The advantage of priority based MVP derivation is to increase the availability of the spatial MVP candidate without the need of additional side information.

In the H.264/AVC standard, the temporal DIRECT mode is used for B slices where the motion vectors for a current block in the B slice is derived from the motion vector of the co-located block in the first list 1 reference picture as shown in FIG. 1. The motion vector derivation for the temporal DIRECT mode is described in "Direct Mode Coding for Bipredictive Slices in the H.264 Standard", authored by Tourapis et al., in IEEE Trans. on Circuits and Systems for Video Technology, Vol. 15, No. 1, pp. 119-126, January 2005. The motion vector for the co-located block 120 of the first list 1 reference is denoted as $\overrightarrow{MV}$. The motion vectors for the current block 110 are denoted as $\overrightarrow{MV}_{L0}$ and $\overrightarrow{MV}_{L1}$ with respect to the list 0 reference picture and list 1 reference picture. The temporal distance between the current picture and the list 0 reference picture is denoted as $TD_B$ and the temporal distance between the list 0 reference picture and the list 1 reference picture is denoted as $TD_D$. The motion vectors for the current block can be derived according to:

$$\overrightarrow{MV}_{L0} = \frac{TD_B}{TD_D} \times \overrightarrow{MV} \quad (1)$$

$$\overrightarrow{MV}_{L1} = \frac{(TD_B - TD_D)}{TD_D} \times \overrightarrow{MV} \quad (2)$$

The above equations were later replaced by:

$$X = \frac{(16384 + \text{abs}(TD_D/2))}{TD_D}, \quad (3)$$

$$ScaleFactor = \text{clip}(-1024, 1023, (TD_B \times X + 32) >> 6), \quad (4)$$

$$\overrightarrow{MV}_{L0} = (ScaleFactor \times \overrightarrow{MV} + 128) >> 8, \text{ and} \quad (5)$$

$$\overrightarrow{MV}_{L1} = \overrightarrow{MV}_{L0} - \overrightarrow{MV}, \quad (6)$$

so that X and ScaleFactor can be pre-computed at the slice/picture level. In the temporal DIRECT mode, the motion vector prediction is only based on the motion vector for the co-located block of the first list 1 reference.

Figure 2:
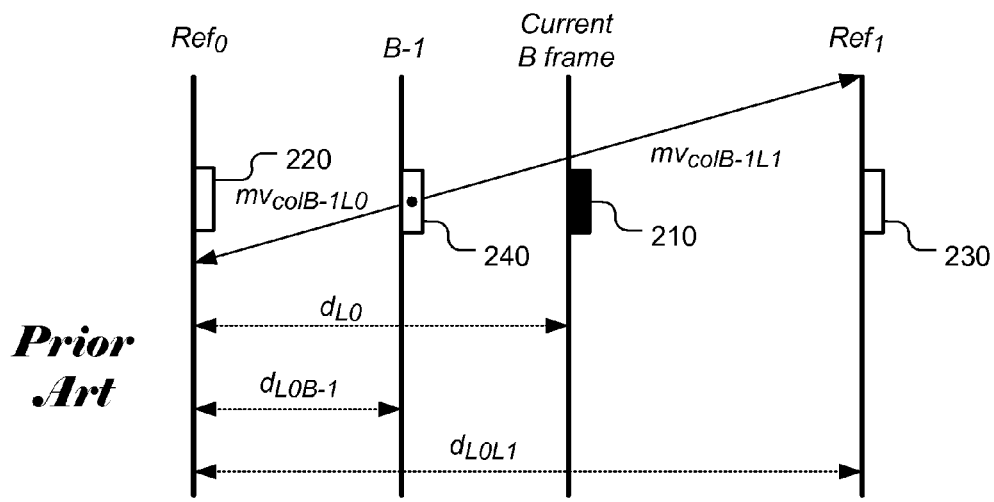
FIG. 2 illustrates motion vector scaling in B slice coding based on a co-located motion vector of the first previous B frame according to a prior art.

In another prior art, entitled "RD Optimized Coding for Motion Vector Predictor Selection", by Laroche et al., in IEEE Trans. on Circuits and Systems for Video Technology, Vol. 18, No. 12, pp. 1681-1691, December 2008, motion vector prediction selection based on motion vector competition is disclosed. The motion vector competition scheme uses rate-distortion (RD) optimization to determine the best motion vector predictor from motion vector predictor candidates. For example, as shown in FIG. 2, the temporal motion vector predictor candidates may include the list 0 motion vector corresponding to the co-located block in the list 1 co-located picture Ref$_1$, and the list 0 and list 1 motion vectors for a co-located block in the list 0 co-located picture, B-1. The list 0 motion vectors corresponding to the co-located block in the list 1 co-located picture Ref$_1$ can be calculated in the same way as defined in the H.264/AVC standard:

$$mv_1^{L0} = \frac{mv_{colL1}}{d_{L0L1}} \times d_{L0}, \text{ and} \quad (7)$$

$$mv_1^{L1} = \frac{mv_{colL1}}{d_{L0L1}} \times (d_{L0} - d_{L0L1}). \quad (8)$$

The list 0 and list 1 motion vectors for a co-located block in the list 0 co-located picture, B-1, can be used to derive motion vector predictor for the current block. If only the co-located motion vector $$mv_{colB-1_{L0}}$$

in picture B-1 pointing to a forward P-picture exists, the motion predictors $mv_3^{L0}$ and $mv_{23}^{L1}$ can be calculated according to:

$$mv_3^{L0} = \frac{mv_{colB-1_{L0}}}{d_{L0B-1}} \times d_{L0}, \text{ and} \quad (9)$$

$$mv_3^{L1} = \frac{mv_{colB-1_{L0}}}{d_{L0B-1}} \times (d_{L0} - d_{L0L1}). \quad (10)$$

The motion vector $$mv_{colB-1_{L0}}$$

is depicted in FIG. 2 and $d_{LOB-1}$ is the temporal distance between the forward P-frame and frame B-1. In the case of backward prediction, the predictors $mv_4^{L0}$ and $mv_4^{L1}$ can be calculated according to:

$$mv_4^{L0} = \frac{mv_{col_{B-1_{L1}}}}{(d_{L0B-1} - d_{L0L1})} \times d_{L0}, \text{ and} \quad (11)$$

$$mv_4^{L1} = \frac{mv_{col_{B-1_{L1}}}}{(d_{L0L1} - d_{L0B-1})} \times (d_{L0L1} - d_{L0}). \quad (12)$$

The motion vector $$mv_{col_{B-1_{L1}}}$$

is the co-located motion vector in picture B-1 pointing to the past P-frame as depicted in FIG. 2. Depending on the availability, the corresponding predictors in equations (7)-(12) based on temporal motion vectors $$mv_{col_{B-1_{L0}}} \text{ and } mv_{col_{B-1_{L1}}},$$

and spatial motion vectors can be used for the current block and the RD optimization is applied to select the best motion vector predictor. The motion vector prediction scheme according to Laroche et al. will require side information to be transmitted to the decoder side to indicate the particular motion vector predictor selected. The transmission of side information associated with the selected motion vector predictor will consume some bandwidth. Whether the motion vector competition scheme is enabled or disabled, spatial and temporal motion vector prediction can be beneficial for reducing motion vector residues. It is desirable to develop a spatial and/or temporal motion vector prediction technique to enhance the availability of any spatial and/or temporal motion vector predictor without the need of side information regardless whether the motion vector competition is used or not. This disclosure focuses on the development of spatial motion vector prediction techniques to enhance any spatial motion vector predictor to improve the performance of a coding system for systems with motion vector competition as well as without motion vector competition.

Figure 3:
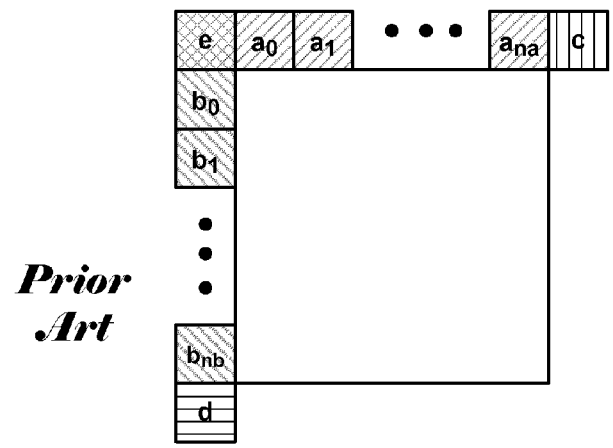
FIG. 3 illustrates neighboring block configuration of spatial motion vector prediction based on motion vectors of the neighboring blocks in the Advanced Motion Vector Prediction (AMVP) being considered for the HEVC standard.

In HEVC development, a technique named Advanced Motion Vector Prediction (AMVP) is proposed by McCann et al., entitled "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr., 2010. The AMVP technique uses explicit predictor signaling to indicate the MVP candidate or MVP candidate set selected. The MVP candidate set includes spatial MVP candidates as well as temporal candidates, where the spatial MVP candidates includes three candidates a', b' and c' as shown in FIG. 3. The candidate a' is the first available motion vector from the group of blocks $\{a_0, a_1, \ldots, a_{na}\}$ on the top side of the current block as shown in FIG. 3, where na is the number of blocks in this group. The candidate b' is the first available motion vector from the group of blocks $\{b_0, b_1, \ldots, b_{nb}\}$ on the left side of the current block as shown in FIG. 3, where nb is the number of blocks in this group. The candidate c' is the first available motion vector from the group of blocks $\{c, d, e\}$ on the neighboring corners of the current block as shown in FIG. 3. The MVP candidate set proposed by McCann et al. is defined as {median(a', b', c'), a', b', c', temporal MVP candidate}. The temporal MVP candidate is a co-located MV. The AMVP technique being developed for HEVC only considers the MV (motion vector) with the same reference list and the same reference picture index as an available spatial MVP candidate. If the MV with the same reference list and the same reference picture index is not available from the neighboring block, the AMVP technique looks for available motion vector from the next neighboring block in the group. It is very desirable to develop a MVP scheme that can improve the availability of the motion vector predictor or the motion vector predictor candidate from the neighboring block. The improved MVP scheme may cause smaller motion vector residues and consequently the coding efficiency can be improved. Furthermore, it is desirable that the MVP scheme will allow the predictor to be derived at the decoder based on decoded information so that no additional side information has to be transmitted.

Figure 4:
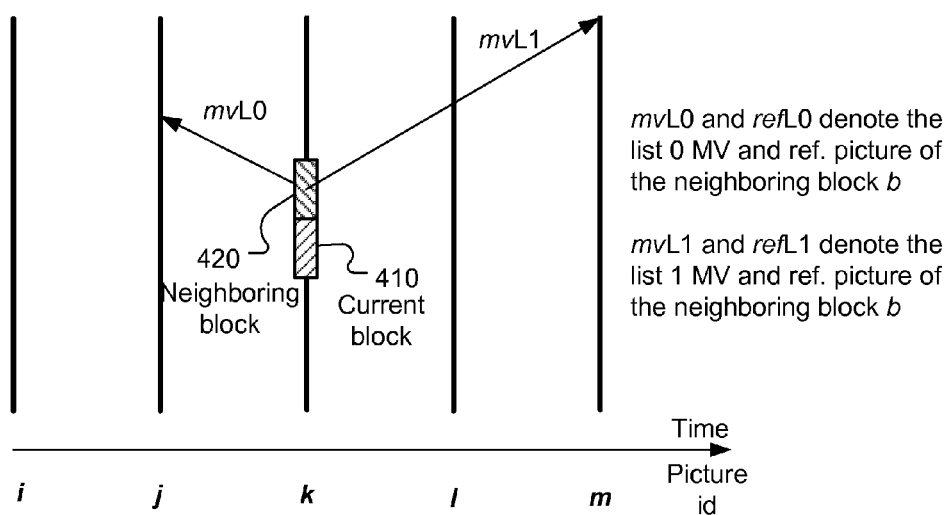
FIG. 4 illustrates an example of spatial MVP candidate derivation for a current block based on the reference pictures (refL0, refL1) and MVs (mvL0, mvL1) of the neighboring block b with a pre-defined order.

Accordingly, a priority-based MVP scheme is disclosed where the spatial MVP or spatial MVP candidate can be derived from a spatially neighboring block based on different lists and different reference pictures of the spatially neighboring block. FIG. 4 illustrates an example of spatial MVP candidate for a current block 410 from a neighboring block 420 derived based on the reference pictures (refL0, refL1) and MVs (mvL0, mvL1) of the neighboring block b with a pre-defined order, where mvL0 and refL0 denote the list 0 MV and reference picture of the neighboring block b, and mvL1 and refL1 denote the list 1 MV and reference picture of the neighboring block b. The MVP scheme extends the MVP candidates to both list 0 and list 1 and furthermore, different reference pictures from list 0 and list 1 may be used in the MVP derivation. Depending on the configuration of the motion vector prediction, the derived motion vector from the spatially neighboring block may be used as the predictor for the current block, or the derived motion vector is one of several motion vector predictor candidates to be considered by the current block for the motion vector predictor. Furthermore, some embodiments according to the present invention may derive more than one motion vectors as motion vector predictor candidates and the motion vector predictor candidates are collectively called a motion vector predictor candidate set. The candidate MVs will be selected in a pre-defined order or an adaptive order to save the side information required. The list 0 and list 1 reference pictures of MVs can be set to a pre-defined value (e.g., reference picture index=0) or sent explicitly.

Figure 5A:
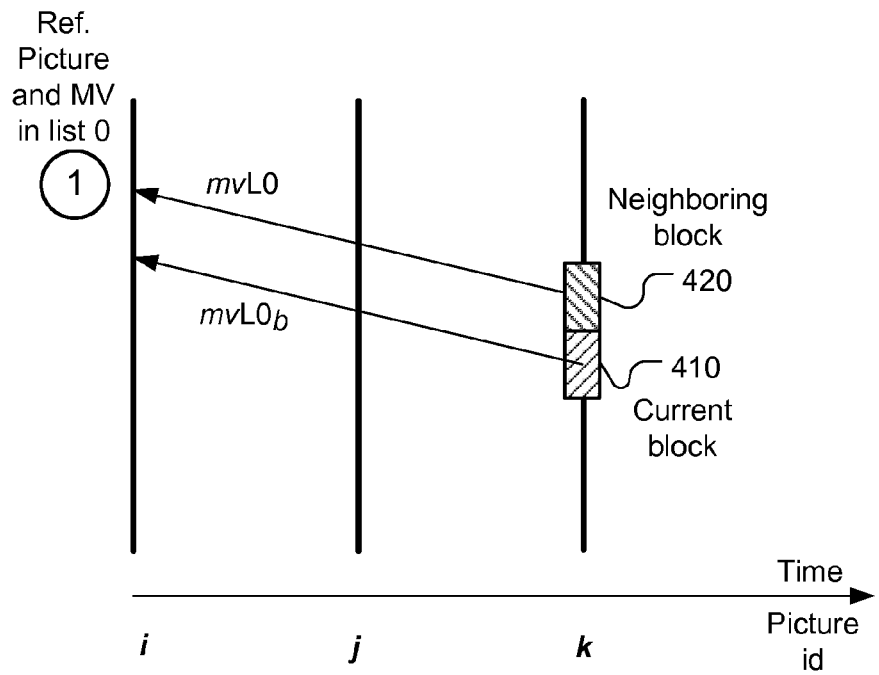
FIGS. 5A-B illustrate an example of determining the list 0 spatial MVP candidate (refL0$_b$, mvL0$_b$) for a current block from a neighboring block b with a pre-defined order.
Figure 5B:
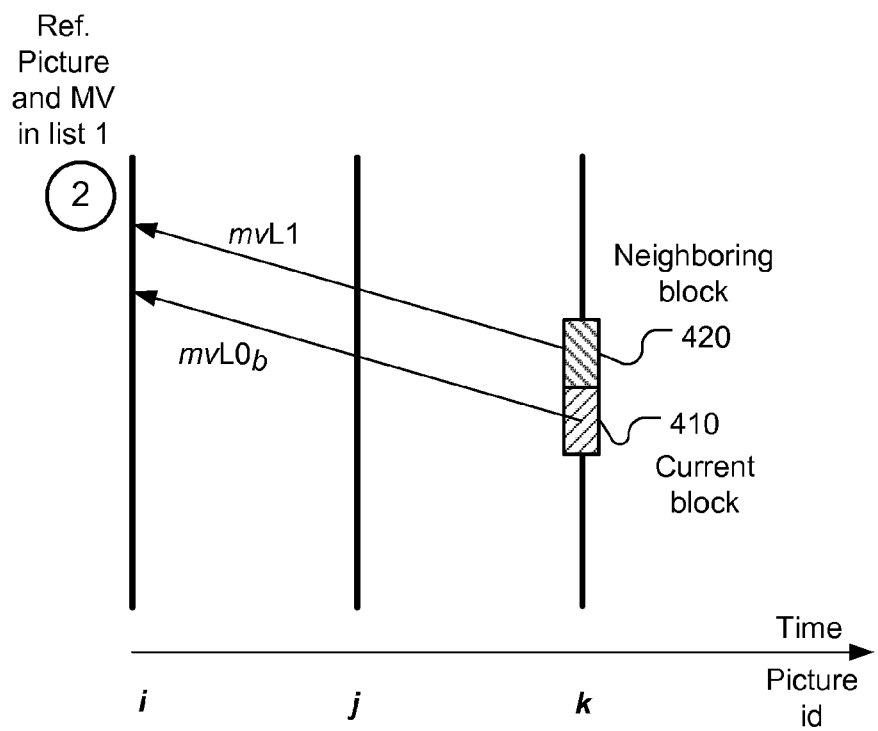

FIGS. 5A-B illustrate an example of determining a spatial MVP candidate according to the MVP scheme of FIG. 4, where the MVP candidate for the current block is associated with a reference picture in list 0 of the current block. While the reference picture in list 0 of the current block is used as an example, the current MVP scheme may also applied to the MVP candidate for the current block associated with a reference picture in list 1 of the current block. As shown in FIGS. 5A-B, the list 0 spatial MVP candidate (refL0$_b$, mvL0$_b$) for a current block is derived from a neighboring block b with a pre-defined order. In FIG. 5A, the choice of the MVP candidate for the current block 410 based on the neighboring block b 420 is first considered for (refL0, mvL0) if mvL0 exists and refL0 is the same as the list 0 reference picture of the current block. If mvL0 does not exist or refL0 is not the same as the list 0 reference picture of the current block, the process considers MVP candidate (refL1, mvL1) as the second choice for the current block 410 if mvL1 exists and refL1 is the same as the list 0 reference picture of the current block. If mvL1 does not exist or refL1 is not the same as the list 0 reference picture of the current block, the MVP candidate (refL0$_b$, mvL0$_b$) for the current block is not available. The process of MVP candidate derivation is described in the following pseudo codes:

- If mvL0 exists and refL0 is the same as the list 0 reference picture of the current block,
  then refL0$_b$ = refL0 and mvL0$_b$ = mvL0;
- Else if mvL1 exists and refL1 is the same as the list 0 reference picture of the current block,
  then refL0$_b$ = refL1 and mvL0$_b$ = mvL1;
- Else,
  (refL0$_b$, mvL0$_b$) is not available.

While FIGS. 5A-B illustrate an example of determining the list 0 spatial MVP candidate (refL0$_b$, mvL0$_b$) for the current block from a neighboring block b with a pre-defined order, a skilled person in the art may use other pre-defined priority orders to achieve the same or similar goal. Furthermore, while the list 0 reference picture of the current block is used as an example in the above MVP scheme, a list 1 reference picture of the current block may also be used.

Figure 6:
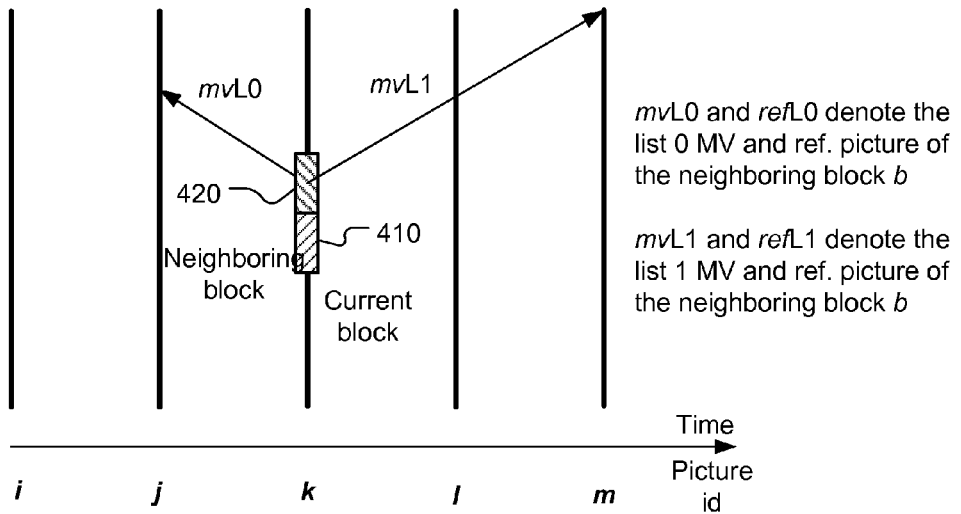
FIG. 6 illustrates an example of spatial MVP candidate set derivation for a current block based on the reference pictures (refL0, refL1) and MVs (mvL0, mvL1) of the neighboring block with a pre-defined order.
Figure 7A:
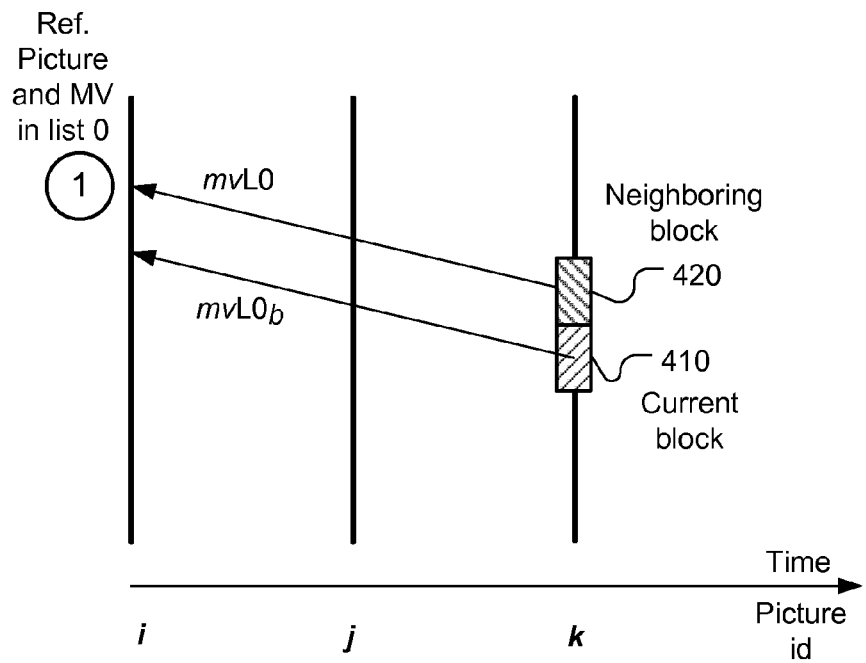
FIGS. 7A-B illustrate an example of determining the list 0 spatial MVP candidate set {(ref0L0$_b$, mv0L0$_b$),(ref1L0$_b$, mv1L0$_b$)} for a current block from a neighboring block b with a pre-defined order.
Figure 7B:
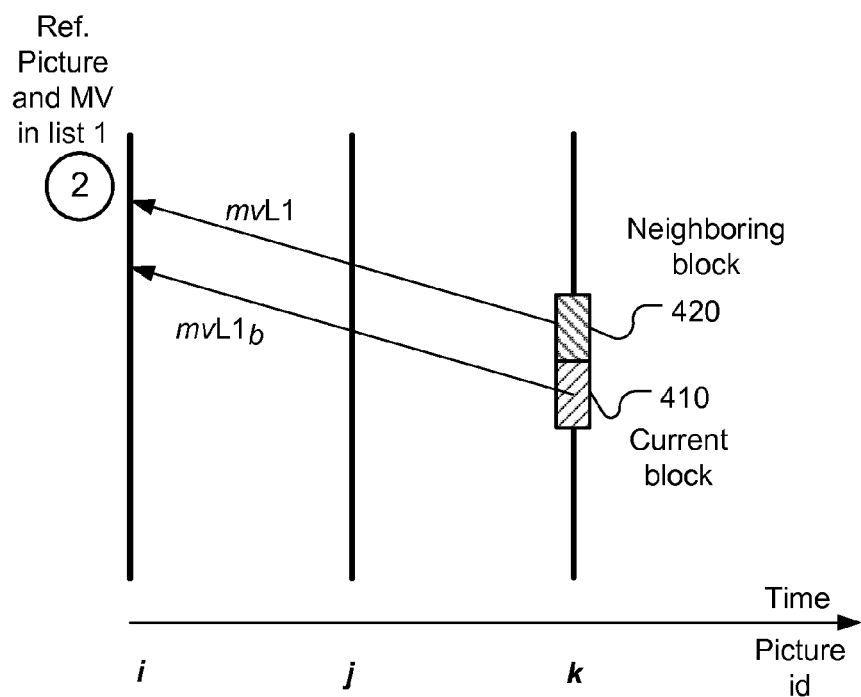

The embodiment according to the present invention shown in FIGS. 5A-B derives a single spatial MVP candidate for the current block from a neighboring block b with a pre-defined order. The MVP scheme can be extended to derive a spatial MVP candidate set, which may provide better MV prediction and/or provides more choices for selecting the best MVP. One embodiment according to the present invention to derive a spatial MVP candidate set {(ref0L0$_b$, mv0L0$_b$), (ref1L0$_b$, mv1L0$_b$)} for a current block from a neighboring block b with a pre-defined order is shown in FIG. 6. Again, mvL0 and refL0 denote the list 0 MV and reference picture of the neighboring block b, and mvL1 and refL1 denote the list 1 MV and reference picture of the neighboring block b. FIGS. 7A-B illustrate an example of determining the list 0 spatial MVP candidate set {(ref0L0$_b$, mv0L0$_b$), (ref1L0$_b$, mv1L0$_b$)} for the current block from the neighboring block b with a pre-defined order. As shown in FIG. 7A, the MV associated with (refL0, mvL0) from the spatially neighboring block b is first considered. The MVP candidate (ref0L0$_b$, mv0L0$_b$) for the current block 410 based on the neighboring block b 420 is set to (refL0, mvL0) if mvL0 exists and refL0 is the same as the list 0 reference picture of the current block. If mvL0 does not exist or refL0 is not the same as the list 0 reference picture of the current block, the MVP candidate (ref0L0$_b$, mv0L0$_b$) is not available. As shown in FIG. 7B, the MV associated with (refL1, mvL1) from the spatially neighboring block b is next considered. The MVP candidate (ref1L0$_b$, mv1L0$_b$) for the current block 410 based on the neighboring block b 420 is set to (refL1, mvL1) if mvL1 exists and refL1 is the same as the list 0 reference picture of the current block. If mvL1 does not exist or refL1 is not the same as the list 0 reference picture of the current block, the MVP candidate (ref1L0$_b$, mv1L0$_b$) is not available. The process of MVP candidate set derivation is described in the following pseudo codes:

- If mvL0 exists and refL0 is the same as the list 0 reference picture of the current block,
  then ref0L0$_b$ = refL0 and mv0L0$_b$ = mvL0;
- Else,
  (ref0L0$_b$, mv0L0$_b$) is not available;
- If mvL1 exists and refL1 is the same as the list 0 reference picture of the current block,
  then ref1L0$_b$ = refL1 and mv1L0$_b$ = mvL1;
- Else,
  (ref1L0$_b$, mv1L0$_b$) is not available.

While FIGS. 7A-B illustrate an example of determining the list 0 spatial MVP candidate set {(ref0L0$_b$, mv0L0$_b$), (ref1L0$_b$, mv1L0$_b$)} for the current block from a neighboring block b with a pre-defined order, a skilled person in the art may use other pre-defined priority orders to achieve the same or similar goal. Furthermore, while the list 0 reference picture of the current block is used in the above MVP scheme, the list 1 reference picture of the current block may also be used.

Figure 8:
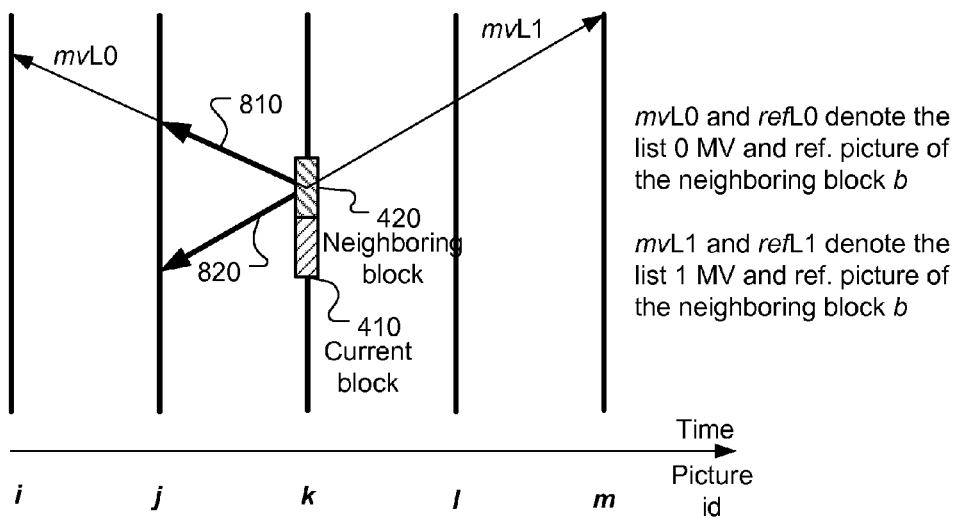
FIG. 8 illustrates an example of spatial MVP candidate derivation for a current block based on the reference pictures (refL0, refL1) and scaled MVs (mvL0, mvL1) of the neighboring block b with a pre-defined order.
Figure 9:
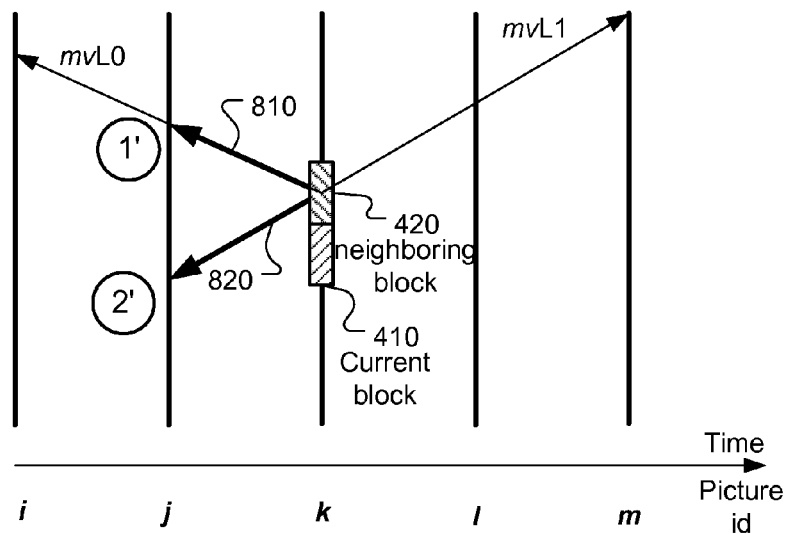
FIG. 9 illustrates an example of determining the list 0 spatial MVP candidate (refL0$_b$, mvL0$_b$) for a current block based on scaled and non-scaled MVs from a neighboring block b with a pre-defined order.

While FIG. 4 illustrates an example of deriving the spatial MVP candidate for a current block from a neighboring block based on the reference pictures (refL0, refL1) and MVs (mvL0, mvL1) of the neighboring block with a pre-defined order, a scaled version of (mvL0, mvL1) 810-820 may also be used to derive the MVP candidate in addition to the non-scaled (mvL0, mvL1) as shown in FIG. 8. The scaling factor is derived according to the temporal distance or difference between picture order counts, which can be positive as well as negative. Examples of motion vector scaling disclosed by Tourapis et al., in IEEE Trans. on Circuits and Systems for Video Technology, Vol. 15, No. 1, pp. 119-126, January 2005 and Laroche et al., in IEEE Trans. on Circuits and Systems for Video Technology, Vol. 18, No. 12, pp. 1681-1691, December 2008 can be applied to derive the scaled motion vectors. Nevertheless, other temporal motion vector scaling may also be applied to derive the scaled motion vector for the current MVP scheme. The list 0 and list 1 reference pictures of the MVs can be set to a pre-defined value (e.g., reference picture index=0) or sent explicitly. An example of deriving the MVP candidate using scaled MVs (mvL0, mvL1) from the neighboring block b is shown in FIG. 9. The process of deriving the MVP candidate is similar to that shown in FIGS. 5A-B except that a scaled MVP candidate is used when reference picture of the neighboring block is not the same as the list 0 reference picture of the current block. The list 0 reference picture index for the current block in the example of FIG. 9 is 0, i.e., refL0$_b$=j. The motion vector mvL0 is considered first. If mvL0 exists, the selection of the MVP candidate for the current block goes to mvL0 if refL0 is the same as the list 0 reference picture of the current block. If refL0 is not the same as the list 0 reference picture of the current block, the scaled mvL0 810 is used as the MVP candidate as shown in FIG. 9. If mvL0 does not exist, the MVP scheme checks next if mvL1 exists. If mvL1 exists, the selection of the MVP candidate for the current block goes to mvL1 if refL1 is the same as the list 0 reference picture of the current block. If refL1 is not the same as the list 0 reference picture of the current block, the scaled mvL1 820 is selected as the MVP candidate as shown in FIG. 9. The process of MVP candidate derivation is described in the following pseudo codes:

- If mvL0 exists,
  ○ If refL0 is the same as the list 0 reference picture of the current block, then mvL0$_b$ = mvL0;
  ○ Else,
     mvL0$_b$ = scaled mvL0;
- Else if mvL1 exists,
  ○ If refL1 is the same as the list 0 reference picture of the current block, then mvL0$_b$ = mvL1;
  ○ Else,
     mvL0$_b$ = scaled mvL1;
- Else,
  ○ mvL0$_b$ is not available.

Figure 10:
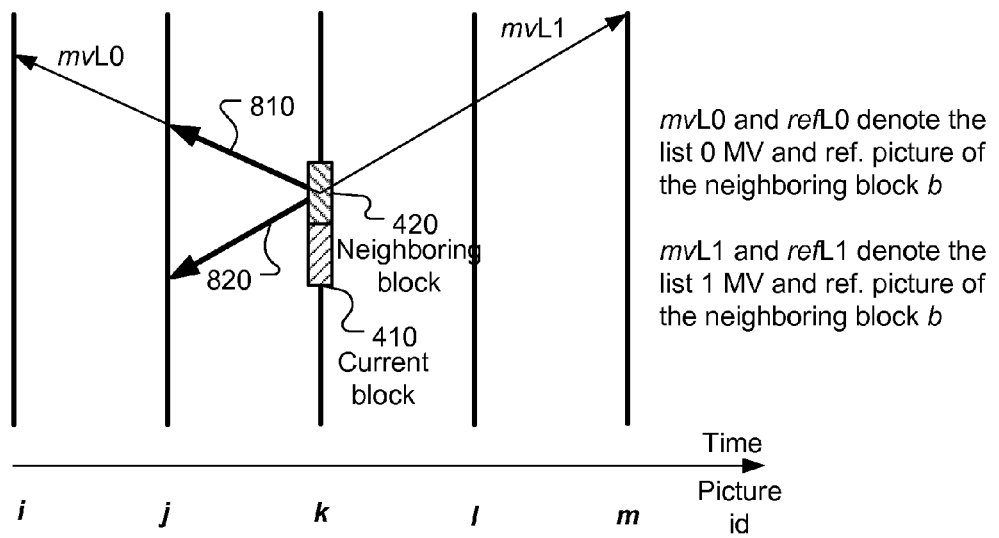
FIG. 10 illustrates an example of spatial MVP candidate set derivation for a current block based on the reference pictures (refL0, refL1) and scaled and non-scaled MVs (mvL0, mvL1) of the neighboring block b with a pre-defined order.
Figure 11:
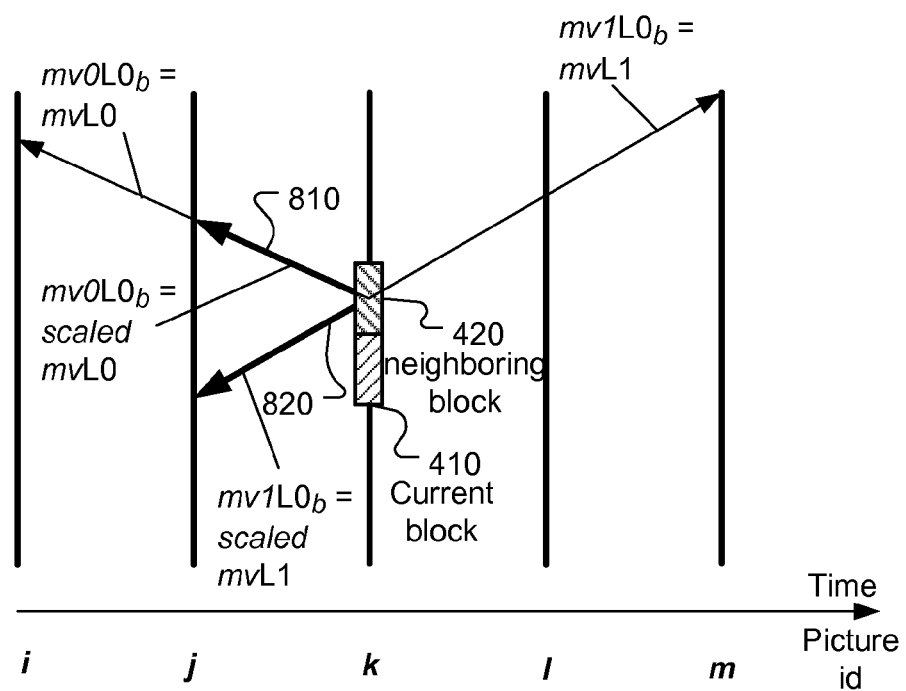
FIG. 11 illustrate an example of determining the list 0 spatial MVP candidate set {(ref0L0$_b$, mv0L0$_b$), (ref1L0$_b$, mv1L0$_b$)} for a current block based on scaled and non-scaled MVs from a neighboring block b with a pre-defined order.

While FIG. 6 illustrates an example of spatial MVP candidate set for a current block from a neighboring block based on the reference pictures (refL0, refL1) and MVs (mvL0, mvL1) of the neighboring block with a pre-defined order, a scaled version of (mvL0, mvL1) may also be included in the MVP candidate set {(ref0L0$_b$, mv0L0$_b$), (ref1L0$_b$, mv1L0$_b$)} in addition to the non-scaled (mvL0, mvL1) as shown in FIG. 10. The scaling factor can be derived according to the temporal distance as described in the examples mentioned previously and other scaling methods can be used as well. Similar to the example of FIG. 8, the list 0 and list 1 reference pictures of MVs for the spatially neighboring block b 420 can be set to a pre-defined value (e.g., reference picture index=0) or sent explicitly. An example of MVP scheme including scaled MVs (mvL0, mvL1) of the neighboring block b 420 in the MVP candidate set is shown in FIG. 11, where the list 0 reference picture index used in this example is 0, i.e. ref0L0$_b$=ref1L0$_b$=j. The process of deriving a MVP candidate set is similar to that shown in FIGS. 7A-B except that scaled MVs may also be included in the candidate set. Again, mvL0 is considered first for deriving the MVP candidate set. If mvL0 exists, the selection of the MVP candidate for the current block goes to mvL0, i.e., mv0L0$_b$=mvL0 if refL0 is the same as the list 0 reference picture of the current block as shown in FIG. 11. If refL0 is not the same as the list 0 reference picture of the current block, the scaled mvL0 810 is selected as the MVP candidate, i.e., mv0L0$_b$=scaled mvL0 as shown in FIG. 11. The MVP scheme checks next if mvL1 exists. If mvL1 exists, selection of the second MVP candidate of the candidate set for the current block goes to mvL1, i.e., mv1L0$_b$=mvL1, if refL1 is the same as the list 0 reference picture of the current block. If refL1 is not the same as the list 0 reference picture of the current block, the scaled mvL1 820 is selected as the second MVP candidate, i.e., mv1L0$_b$=scaled mvL1, of the candidate set as shown in FIG. 11. The process of MVP candidate set derivation is described in the following pseudo codes:

- If mvL0 exists,
  o If refL0 is the same as the list 0 reference picture of the current block, then mv0L0$_b$ = mvL0;
  o Else,
    mv0L0$_b$ = scaled mvL0;
- Else,
  o mv0L0$_b$ is not available,
- If mvL1 exists,
  o If refL1 is the same as the list 0 reference picture of the current block, then mv1L0$_b$ = mvL1;
  o Else,
    mv1L0$_b$ = scaled mvL1;
- Else,
  o mv1L0$_b$ is not available.

It is obvious for those skilled in the art to modify the above embodiments so that only the scaled version of MVs is used to derive the MVP candidate or MVP candidate set. For example, the process of MVP candidate derivation based on the scaled MVs is described in the following pseudo codes:

- If mvL0 exists,
  mvL0$_b$ = scaled mvL0;
- Else if mvL1 exists,
  mvL0$_b$ = scaled mvL1;
- Else,
  mvL0$_b$ is not available.

The process of MVP candidate set derivation based on the scaled MVs is described in the following pseudo codes:

- If mvL0 exists,
  mv0L0$_b$ = scaled mvL0;
- Else,
  mv0L0$_b$ is not available,
- If mvL1 exists,
  mv1L0$_b$ = scaled mvL1;
- Else,
  mv1L0$_b$ is not available.

In the above examples of motion vector prediction candidate derivation according to a pre-defined priority order, a respective priority order is used in each example to illustrate the process of deriving a predictor or predictor candidate based on motion vectors from a spatially neighboring block. The particular priority order used is by no means construed as a limitation to the present invention. A skilled person in the field may choose different priority orders for the motion vector predictor candidates to practice the present invention. Furthermore, while the above examples illustrate that the order of motion vector prediction among the candidates is determined according to a pre-defined priority order, the priority order of the candidates can also be performed according to an adaptive scheme. The scheme of adaptive priority ordering can be based on the statistic of the reconstructed motion vectors of previous blocks, the partition type of current block, the correlation of the motion vectors, the directions of motion vector, and the distance of the motion vectors. Also, the adaptive scheme may also be based on a combination of two or more of the factors mentioned above.

When the statistic of the reconstructed motion vectors of previous blocks is used for the adaptive scheme, the statistic may be associated with the counts of the motion vector candidates as an example. The priority order is adapted to the counts of the motion vector candidates, where the motion vector candidate having a higher count will be assigned a higher priority for motion vector predictor. When the partition type of current block is used for the adaptive scheme, for example, if a current coding unit of size 2N×2N is divided into two rectangular prediction units of size N×2N and the current block is the left prediction unit, the motion vector with higher similarity to the left neighbor of the current coding unit will be assigned a higher priority; if a current coding unit of size 2N×2N is divided into two rectangular prediction units of size N×2N and the current block is the right prediction unit, the motion vector with higher similarity to the above right neighbor of the current coding unit will be assigned a higher priority. When the correlation of the motion vectors is used for the adaptive scheme, the motion vector with higher correlation will be assigned with a higher priority. For example, if two motion vectors in the priority list are exactly the same, the motion vector is considered to have higher correlation. When the direction of motion vector is used for the adaptive scheme, the motion vector pointing to the direction of the target reference picture, as an example, will be assigned with a higher priority. When the distance of the motion vectors is used for the adaptive scheme, a shorter temporal distance for the motion vector from a current block to the target reference picture, as an example, will be assigned with a higher priority.

While the examples above illustrate derivation of motion vector predictor or motion vector predictor candidate for a current block with respect to a reference picture in list 0 of the current block, similar technique can be applied to derive motion vector predictor or motion vector predictor candidate for the current block with respect to a reference picture in list 1 of the current block. Furthermore, while each exemplary derivation of MVP or MVP candidate illustrated above adopts particular combinations of reference picture list of the current block, reference picture list of the spatially neighboring block, and non-scaled motion vectors and scaled motion vectors of the spatially neighboring block, other combinations may also be used for MVP candidate derivation.

It is noted that the present invention can be applied to not only INTER mode but also SKIP, DIRECT, and MERGE modes. In the INTER mode, given a current list, a motion vector predictor is used to predict the motion vector of a PU, and a motion vector residue is transmitted. The current invention can be applied for deriving the motion vector predictor when the motion vector competition scheme is not used or for deriving the motion vector predictor candidate when the motion vector competition scheme is used. As for the SKIP, DIRECT, and MERGE, they can be regarded as special cases of the INTER mode where the motion vector residue is not transmitted and always inferred as zero. In these cases, the current invention can be applied for deriving the motion vector when the motion vector competition scheme is not used or for deriving the motion vector candidate when the motion vector competition scheme is not used.

Embodiment of motion vector prediction according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of coding a current motion vector of a current block in a picture based on motion vectors from spatially neighboring blocks, the method comprising:
   determining a current reference picture and a current reference list associated with the current motion vector (MV) of the current block;
   receiving one or more candidate motion vectors (MVs) from one spatially neighboring block;
   determining at least one MVP (MV predictor) or at least one MVP candidate for the current block based on said one or more candidate MVs according to a priority order associated with a MV attribute set of said one or more candidate MVs, wherein an asserted candidate MV is selected as one MVP or one MVP candidate if the asserted candidate MV has an asserted MV attribute firstly according to the priority order, wherein the MV attribute set comprises a first MV attribute and a second MV attribute, wherein
   the first MV attribute corresponds to whether any of said one or more candidate MVs points to the current reference picture and whether any of said one or more candidate MVs points to the current reference list;
   the second MV attribute corresponds to
      whether any of said one or more candidate MVs points to other reference picture and whether any of said one or more candidate MVs points to the current reference list,
      whether any of said one or more candidate MVs points to the current reference picture and whether any of said one or more candidate MVs points to other reference list, or
      whether any of said one or more candidate MVs points to the other reference picture and whether any of said one or more candidate MVs points to the other reference list; and
   encoding or decoding the current MV of the current block based on said at least one MVP or said at least one MVP candidate.

2. The method of claim 1, wherein information associated with a pre-defined priority order of the MV attribute set is incorporated in a sequence header, a picture header, or a slice header.

3. The method of claim 1, wherein said at least one MVP or said at least one MVP candidate is determined based on a scaled version of the candidate MV if the candidate MV selected points to the other reference picture.

4. The method of claim 3, wherein two MVPs or two MVP candidates are determined based on one spatially neighboring block, wherein one of said two MVPs or two MVP candidates points to the current reference list and another of said two MVPs or two MVP candidates points to the other reference list.

5. The method of claim 1, wherein two MVPs or two MVP candidates are determined based on one spatially neighboring block, wherein one of said two MVPs or two MVP candidates points to the current reference list and another of said two MVPs or two MVP candidates points to the other reference list.

6. The method of claim 1, wherein the first MV attribute has a higher priority than the second MV attribute.

7. The method of claim 1, wherein the MV attribute set comprises two MV attributes corresponding to,
   whether any of said one or more candidate MVs points to the current reference picture and whether any of said one or more candidate MVs points to the current reference list; and
   whether any of said one or more candidate MVs points to the other reference picture and whether any of said one or more candidate MVs points to the current reference list.

8. The method of claim 1, wherein the MV attribute set comprises four MV attributes corresponding to,
   whether any of said one or more candidate MVs points to the current reference picture and whether any of said one or more candidate MVs points to the current reference list;
   whether any of said one or more candidate MVs points to the other reference picture and whether any of said one or more candidate MVs points to the current reference list;
   whether any of said one or more candidate MVs points to the current reference picture whether any of said one or more candidate MVs points to other reference list; and whether any of said one or more candidate MVs points to the other reference picture and whether any of said one or more candidate MVs points to the other reference list.

9. The method of claim 1, wherein if no MV attribute is asserted for one spatially neighboring block, said at least one MVP or said at least one MVP candidate is declared as unavailable for said one spatially neighboring block.

10. An apparatus of coding a current motion vector of a current block in a picture based on motion vectors from spatially neighboring blocks, the apparatus comprising one or more electronic circuits, wherein said one or more electronic circuits are configured to:
   determine a current reference picture and a current reference list associated with the current motion vector (MV) of the current block;
   receive one or more candidate motion vectors (MVs) from one spatially neighboring block;
   determine at least one MVP (MV predictor) or at least one MVP candidate for the current block based on said one or more candidate MVs according to a priority order associated with a MV attribute set of said one or more candidate MVs, wherein an asserted candidate MV is selected as one MVP or one MVP candidate if the asserted candidate MV has an asserted MV attribute firstly according to the priority order, wherein the MV attribute set comprises a first MV attribute and a second MV attribute, wherein
      the first MV attribute corresponds to whether any of said one or more candidate MVs points to the current reference picture and whether any of said one or more candidate MVs points to the current reference list;
      the second MV attribute corresponds to
         whether any of said one or more candidate MVs points to other reference picture and whether any of said one or more candidate MVs points to the current reference list,
         whether any of said one or more candidate MVs points to the current reference picture and whether any of said one or more candidate MVs points to other reference list, or
         whether any of said one or more candidate MVs points to the other reference picture and w whether any of said one or more candidate MVs points to the other reference list; and
   encode or decode the current MV of the current block based on said at least one MVP or said at least one MVP candidate.

11. The apparatus of claim 10, wherein information associated with a pre-defined priority order of the MV attribute set is incorporated in a sequence header, a picture header, or a slice header.

12. The apparatus of claim 10, wherein said at least one MVP or said at least one MVP candidate is determined based on a scaled version of the candidate MV if the candidate MV selected points to the other reference picture.

13. The apparatus of claim 12, wherein two MVPs or two MVP candidates are determined based on one spatially neighboring block, wherein one of said two MVPs or two MVP candidates points to the current reference list and another of said two MVPs or two MVP candidates points to the other reference list.

14. The apparatus of claim 10, wherein two MVPs or two MVP candidates are determined based on one spatially neighboring block, wherein one of said two MVPs or two MVP candidates points to the current reference list and another of said two MVPs or two MVP candidates points to the other reference list.

15. The apparatus of claim 10, wherein the first MV attribute has a higher priority than the second MV attribute.

16. The apparatus of claim 10, wherein the MV attribute set comprises two MV attributes corresponding to,
   whether any of said one or more candidate MVs points to the current reference picture and whether any of said one or more candidate MVs points to the current reference list; and
   whether any of said one or more candidate MVs points to the other reference picture and whether any of said one or more candidate MVs points to the current reference list.

17. The apparatus of claim 10, wherein the MV attribute set comprises four MV attributes corresponding to,
   whether any of said one or more candidate MVs points to the current reference picture and whether any of said one or more candidate MVs points to the current reference list;
   whether any of said one or more candidate MVs points to the other reference picture and whether any of said one or more candidate MVs points to the current reference list;
   whether any of said one or more candidate MVs points to the current reference picture whether any of said one or more candidate MVs points to other reference list; and
   whether any of said one or more candidate MVs points to the other reference picture and whether any of said one or more candidate MVs points to the other reference list.

18. The apparatus of claim 10, wherein if no MV attribute is asserted for one spatially neighboring block, said at least one MVP or said at least one MVP candidate is declared as unavailable for said one spatially neighboring block.

* * * * *